United States Patent
Fujii et al.

(10) Patent No.: US 7,568,548 B2
(45) Date of Patent: Aug. 4, 2009

(54) MOTORCYCLE

(75) Inventors: Katsuji Fujii, Tatsuno (JP); Hideo Beppu, Inashiki-gun (JP); Nobumasa Yoshikawa, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 454 days.

(21) Appl. No.: 11/500,401

(22) Filed: Aug. 8, 2006

(65) Prior Publication Data

US 2007/0034429 A1    Feb. 15, 2007

(30) Foreign Application Priority Data

Aug. 9, 2005    (JP)    ............ P2005-230639

(51) Int. Cl.
*B60K 13/04* (2006.01)
*F01N 3/10* (2006.01)

(52) U.S. Cl. .............. 180/309; 60/299; 60/301; 60/302

(58) Field of Classification Search ............ 80/309; 60/299, 301, 302
See application file for complete search history.

(56) References Cited

U.S. PATENT DOCUMENTS

| | | | | |
|---|---|---|---|---|
| 5,360,081 A | * | 11/1994 | Takegami | 180/309 |
| 5,674,461 A | * | 10/1997 | Kato et al. | 422/179 |
| 6,336,321 B1 | * | 1/2002 | Sagara et al. | 60/324 |
| 7,032,563 B2 | * | 4/2006 | Nakagome et al. | 123/198 E |
| 7,325,651 B2 | * | 2/2008 | Kikuchi et al. | 181/237 |
| 2004/0200658 A1 | * | 10/2004 | Kawakubo et al. | 180/309 |
| 2005/0150703 A1 | * | 7/2005 | Nakagome et al. | 180/219 |
| 2006/0242952 A1 | * | 11/2006 | Muramatsu et al. | 60/299 |

FOREIGN PATENT DOCUMENTS

| | | |
|---|---|---|
| JP | 63-64588 | 4/1988 |
| JP | 06-026375 | 2/1994 |
| JP | 2004-249852 | 9/2004 |
| JP | 2005-083288 | 3/2005 |

* cited by examiner

*Primary Examiner*—Christopher P Ellis
*Assistant Examiner*—John R Olszewski
(74) *Attorney, Agent, or Firm*—Wenderoth, Lind & Ponack, L.L.P.

(57) ABSTRACT

Disclosed is a motorcycle having a cowling covering an under side thereof in which the cowling can be formed so as to avoid a catalyst while maintaining strength of the cowling, and can maintain a large bank angle and secure the minimum road clearance. The motorcycle is provided with a vehicle body provided with an engine, an exhaust pipe connected to the engine, a catalyst apparatus provided in the exhaust pipe and arranged under the engine, and the cowling covering at least an under portion of the vehicle body. An opening in which an entire peripheral edge portion thereof is formed in a closed hole shape is formed at a position of the cowling corresponding to the catalyst apparatus.

6 Claims, 6 Drawing Sheets

MOTORCYCLE

BACKGROUND OF THE INVENTION

1. Field of the Invention

The present invention relates to a motorcycle, and more particularly to a motorcycle in which an exhaust pipe (a catalyst apparatus) is arranged below an engine mounted on a vehicle body of the motorcycle, and at least an under side of the vehicle body is covered by a cowling.

2. Description of the Related Art

In recent years, in the field of motorcycles, it has been desired to remove hydro carbons (HC), nitrogen oxides (NOx) and the like contained in exhaust gas. Japanese Unexamined Patent Publication No. 6-26375 discloses a technique in which an exhaust pipe of a motorcycle is provided with a catalyst apparatus for purifying exhaust gas. The exhaust pipe is extended to a rear side from a front side through a lower side, of an engine of the motorcycle, and the catalyst apparatus is arranged at the lower side of the engine. Further, a vehicle body of the motorcycle is covered by a cowling.

Figure 7:
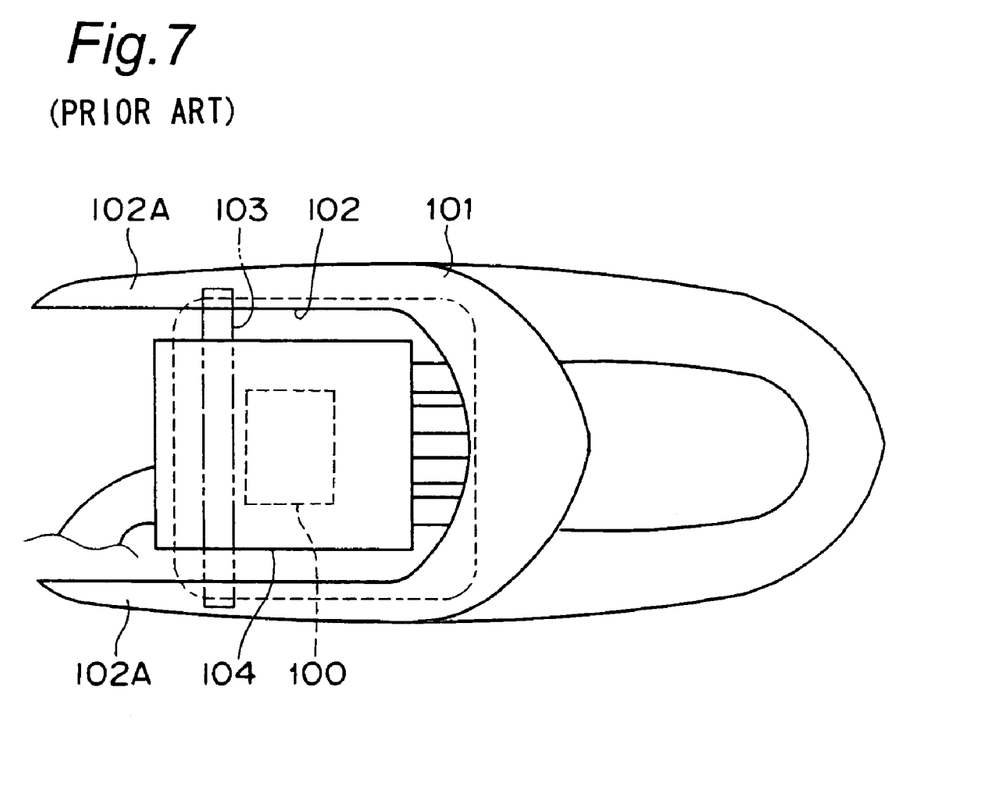
FIG. 7 is a bottom view schematically showing an exhaust pipe and a cowling in accordance with a prior art.

Since the cowling is formed by synthetic resin in most cases, and the exhaust pipe, particularly the catalyst apparatus, reaches a high temperature, the cowling can be exposed to a thermal effect such as deformation, discoloration or the like if the cowling exists near the catalyst apparatus. Further, since the catalyst apparatus normally has a larger diameter than the exhaust pipe, a minimum road clearance of the motorcycle is reduced and a bank angle of the motorcycle becomes lower if a lower side of the catalyst apparatus is covered by the cowling. Accordingly, as shown in FIG. 7, a cowling 101 is set apart from a catalyst apparatus 100 and an exhaust pipe 104 by forming a notch-shaped opening 102 in a lower surface of the cowling 101, thereby making a road clearance of the cowling 101 larger and making a bank angle larger.

However, if the notch-shaped opening 102 is formed as mentioned above, a strength of both end portions 102A, 102A of the notch-shaped opening 102 is lowered, and both end portions 102A, 102A are subject to flip-flop and generation of vibrations while the motorcycle is moving. In order to compensate for the strength of the end portions 102A, 102A, a reinforcing member 103 can be provided in such a manner as to bridge the two end portions 102A, 102A. However, since the reinforcing member 103 is disposed close to the exhaust pipe 104 and the catalyst apparatus 100, and the heat of the exhaust pipe 104 and the catalyst apparatus 100 is transmitted to the cowling via the reinforcing member 103, this structure is not preferable. Further, since the vehicle body is lowered somewhat by the presence of the reinforcing member 103, the minimum road clearance becomes smaller.

SUMMARY OF THE INVENTION

The present invention addresses the above described concerns, and an object of the present invention is to provide a motorcycle having a cowling covering an under side thereof, in which the cowling can be formed so as to avoid an exhaust pipe and a catalyst apparatus while securing a strength of the cowling and can maintain a large bank angle and secure a minimum road clearance.

In order to achieve the objects mentioned above, in accordance with the present invention, there is provided a motorcycle comprising: a vehicle body provided with an engine; an exhaust pipe connected to the engine; a catalyst apparatus provided in the exhaust pipe and arranged below the engine; and a cowling covering at least an under portion of the vehicle body, wherein an opening is formed at a position of the cowling corresponding to the catalyst apparatus, and an entire peripheral edge portion of the opening is formed in a closed hole shape.

In accordance with this structure, it is possible to minimize a reduction in strength of the cowling caused by forming the opening in the cowling. Accordingly, it is possible to form the opening as large as possible in such a manner as to avoid the catalyst apparatus, and it is possible to reduce a heat effect from the catalyst apparatus.

Preferably, the peripheral edge portion of the opening may be provided with a reinforcing member having a shape along the peripheral edge portion.

In accordance with this structure, it is possible to further increase the strength of the peripheral edge portion of the opening. Further, in the case that the reinforcing member is provided in an upper surface of the peripheral edge portion of the opening, the reinforcing member is not lower than the cowling. Accordingly, it is possible to make the bank angle larger and to secure the minimum road clearance.

Preferably, the cowling is structured by a plurality of divided bodies coupled to each other, and the reinforcing member is provided over the plurality of divided bodies.

In accordance with this structure, the reinforcing member can be used as a coupling member for coupling the plurality of divided bodies, and the reinforcing member is provided with both functions of reinforcing the cowling and coupling the divided bodies, whereby it is possible to achieve a reduction in the number of parts and a simplification of the structure on the basis of a common use of the parts. Further, it is possible to firmly couple the divided bodies by the reinforcing member.

Preferably, the reinforcing member may be provided with a mounting portion attached to the cowling via a fixing device, the mounting portion may have a mounting surface directed to a diagonally lower side, and the fixing device may be attached in a direction approximately orthogonal to the mounting surface.

In accordance with this structure, since it is possible to attach the fixing device from the diagonally lower side approximately orthogonal to the mounting surface of the reinforcing member, a procedure for attaching the fixing device can be easily executed in comparison with the case which the fixing device is attached from just below, and it is possible to secure the minimum road clearance. Further, since the fixing device is inconspicuous as seen from the side in comparison with the case in which the fixing device is attached from just beside, it is possible to improve an outer appearance.

Preferably, the reinforcing member may be fixed to one of the divided bodies by a screw, and may be fixed to the other of the divided bodies by a plug-in type-fixing device.

In accordance with this structure, in the case of executing a procedure for fixing the reinforcing member to one of the divided bodies by screw, it is possible to easily execute the procedure in a state of separating both the divided bodies. Further, in the case of executing a procedure for fixing the reinforcing member to the other of the divided bodies, since it is only necessary to insert the plug-in type fixing device although both the divided bodies are in a contact state, it is possible to easily execute the procedure.

Preferably, a part of the catalyst apparatus may protrude to a lower side from the opening.

BRIEF DESCRIPTION OF THE DRAWINGS

These and other objects and features of the present invention will become more clear from the following description taken in conjunction with a preferred embodiment thereof with reference to the accompanying drawings.

DETAILED DESCRIPTION OF THE PREFERRED EMBODIMENTS

Figure 1:
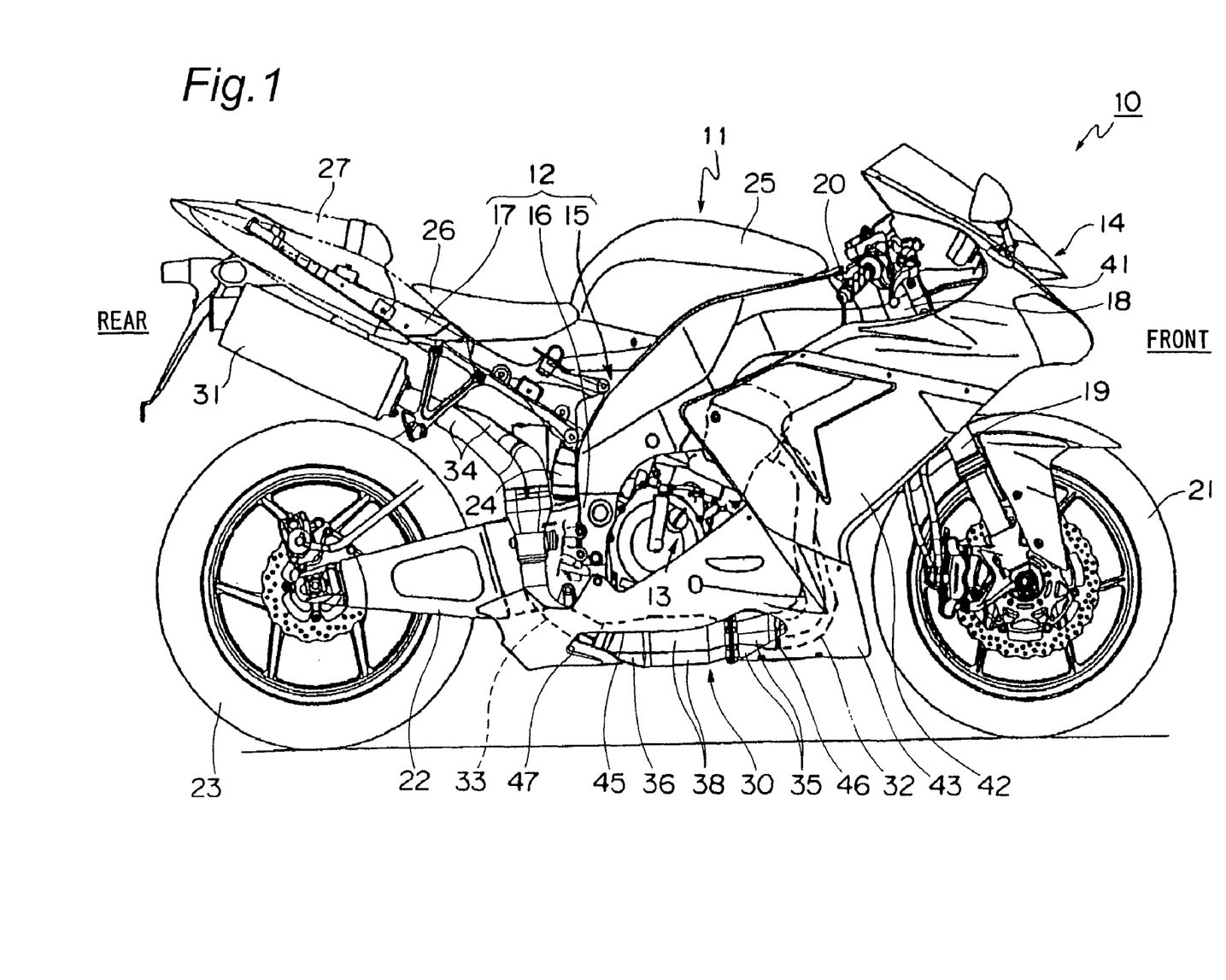
FIG. 1 is a right side elevational view of a motorcycle in accordance with an embodiment of the present invention.

FIG. 1 is a right side elevational view of a motorcycle in accordance with an embodiment of the present invention. In this case, directions used in the following description are based on a direction which a rider riding on the motorcycle views.

A motorcycle 10 includes a vehicle body 11 and a cowling 14. The vehicle body 11 has a vehicle body frame 12, an engine 13, and a swing arm 22 and the like. The cowling 14 covers an outer surface of the vehicle body 11. The vehicle body frame 12 is structured in an approximately Y shape as seen from the side by a main frame 15, a swing arm bracket 16, and a rear frame 17. The main frame 15 extends to a rear side from a head pipe 18 so as to be formed in a backward downward shape, and the swing arm bracket 16 extends from a rear lower end portion of the main frame 15 so as to be formed in a downward protruding shape. The main frame 15 and the swing arm bracket 16 are integrally formed. The rear frame 17 is fixed to a rear end portion of the main frame 15, and extends to a rear side so as to be formed in a backward upward shape. A front fork 19 is supported by the head pipe 18, a handle 20 is provided at an upper end portion of the front fork 19, and a front wheel 21 is supported by a lower end portion of the front fork 19.

The swing arm 22 is supported by the swing arm bracket 16 so as to freely swing in a vertical direction at a front end portion thereof, and a rear wheel 23 is supported by a rear end portion of the swing arm 22. A rear suspension 24 approximately in a standing posture is interposed between the swing arm 22 and the vehicle body frame 12 so as to freely expand and contract. A fuel tank 25, a seat 26 and a rear seat 27 are provided at an upper side of the vehicle body frame 12 in this order from a front side. The engine 13 is arranged in a lower side of the main frame 15.

[Structure of Exhaust Pipe]

An exhaust pipe 30 is connected to cylinder heads of the engine 13. The exhaust pipe 30 extends downward in a front side of the engine 13, is subsequently curved to a rear side, and passes under a lower side of the engine 13. Further, the exhaust pipe 30 rises upward at the rear side of the engine 13, is subsequently curved backward at a lower side of the rear frame 17, and has a rear end portion to which a muffler 31 is coupled.

Figure 2:
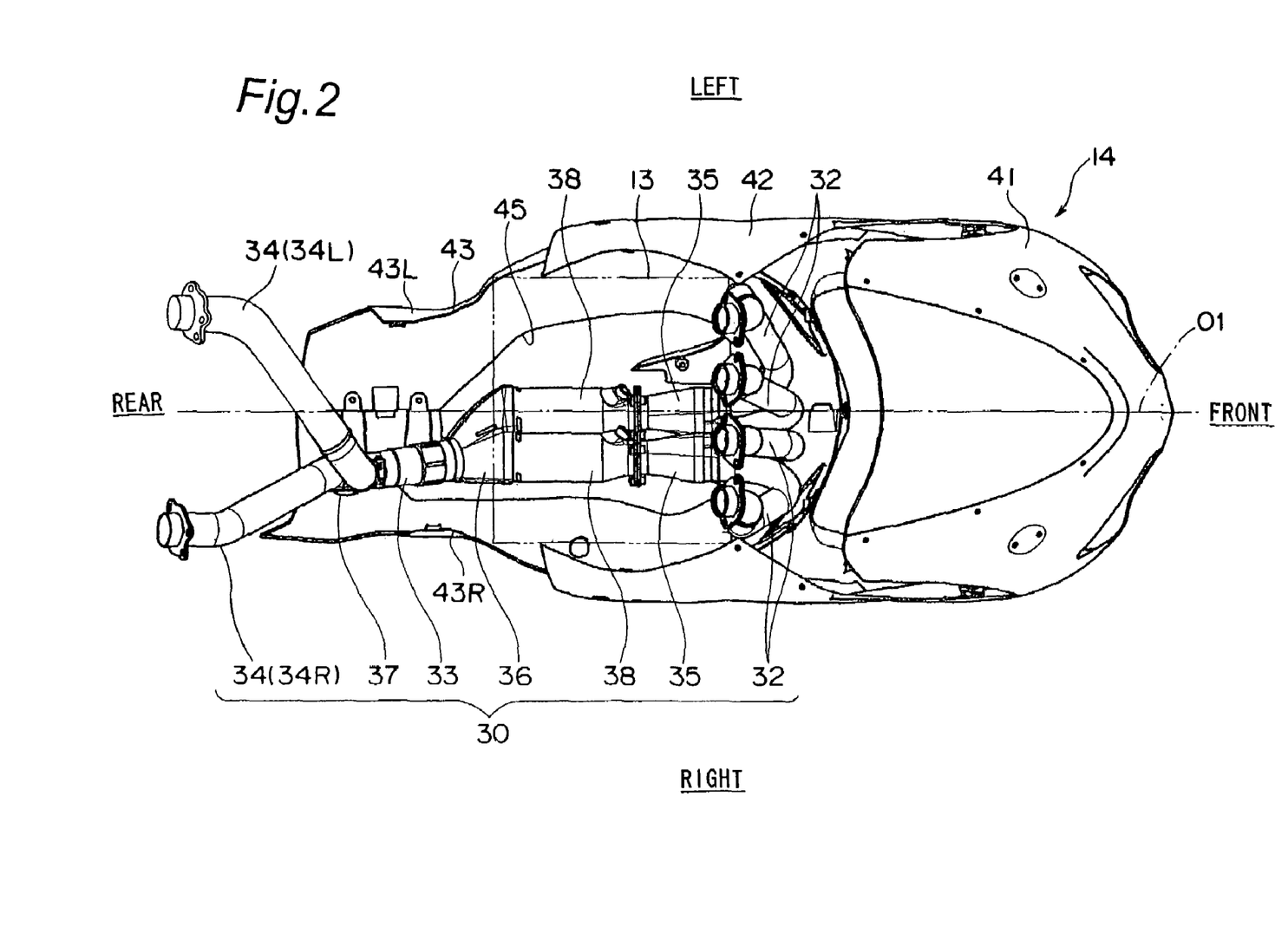
FIG. 2 is a plan view showing an exhaust pipe and a cowling of the motorcycle in FIG. 1.

FIG. 2 is a plan view showing the exhaust pipe 30 and the cowling 14. As shown in FIGS. 1 and 2, the exhaust pipe 30 is constituted by first to third exhaust pipes 32 to 34, first and second collecting pipes 35 and 36, a branch pipe 37 and a catalyst pipe 38. The engine 13 in accordance with the present embodiment is constituted, for example, by a parallel four-cylinder engine. In this case, four of the first exhaust pipes 32 are provided, an upper end portion of each of the first exhaust pipes 32 is connected to each of cylinders of the engine 13. The first exhaust pipes 32 extend downward at the front side of the engine 13, and lower end portions of the first exhaust pipes 32 are curved to a rear side. The first collecting pipe 35 is connected to a lower end portion (a rear end portion) of the first exhaust pipe 32. Two of the first collecting pipes 35 are provided, and each of the first collecting pipes 35 collects two of the first exhaust pipes 32 to one.

The catalyst pipes 38 are respectively connected to rear end portions of first collecting pipes 35. Each of the catalyst pipes 38 is structured such that a catalyst apparatus made of a stainless steel is installed within a tube pipe made of the stainless steel, and harmful material contained in the exhaust gas is removed or purified by the catalyst apparatus. The second collecting pipe 36 is connected to a rear end of each of the catalyst pipes 38. The second collecting pipe 36 collects two of the catalyst pipes 38 to one. The first collecting pipes 35, the catalyst pipes 38 and the second collecting pipe 36 are arranged at the lower side of the engine 13 (the vehicle body 11) in a state in which axes of these pipes 35, 38 and 36 are directed in back and forth direction of the motorcycle, as shown in FIG. 1, and are arranged so as to be displaced slightly to a right side from a vehicle width center O1, as shown in FIG. 2.

The second exhaust pipe 33 is connected to a rear end portion of the second collecting pipe 36, and rises upward through a rear side from a lower side of the engine 13. The second exhaust pipe 33 is arranged so as to be displaced slightly to a right side from the vehicle width center O1. The branch pipe 37 is connected to an upper end portion of the second exhaust pipe 33, and branches the exhaust gas passage into two. Two of the third exhaust pipes 34 are connected to the branch pipe 37, and each of the third exhaust pipes 34 extends to an obliquely rear upper side approximately along a lower side of the rear frame 17, as shown in FIG. 1. A right third exhaust pipe 34R of the third exhaust pipes 34 extends obliquely while being displaced slightly to the right side as shown in FIG. 2, and a left third exhaust pipe 34L of the third exhaust pipes 34 extends obliquely while being displaced largely to the left side.

The catalyst pipes 38 are formed by stainless steel, and the other pipes 32 to 37 are formed by titanium, whereby a weight saving of the exhaust pipe 30 is achieved.

As shown in FIG. 1, the muffler 31 is connected to rear end portions of the third exhaust pipes 34, and the muffler 31 is arranged between the rear frame 17 and the rear wheel 23 in a vertical direction, and in both sides (only shown in a right side in FIG. 1) of the vehicle body 11 in a lateral direction.

[Structure of Cowling]

As shown in FIG. 1, the cowling 14 includes a front cowling 41, a side cowling 42 and a lower cowling 43, and they are formed by independent bodies and are coupled to each other. The front cowling 41 mainly covers around the handle 20, and the side cowling 42 covers both sides in the lateral direction of the front portion of the vehicle body 11. The lower cowling 43 covers a lower side and an under side of the engine 13 and the exhaust pipe 30 from both sides in the lateral direction and a lower side.

Figure 3:
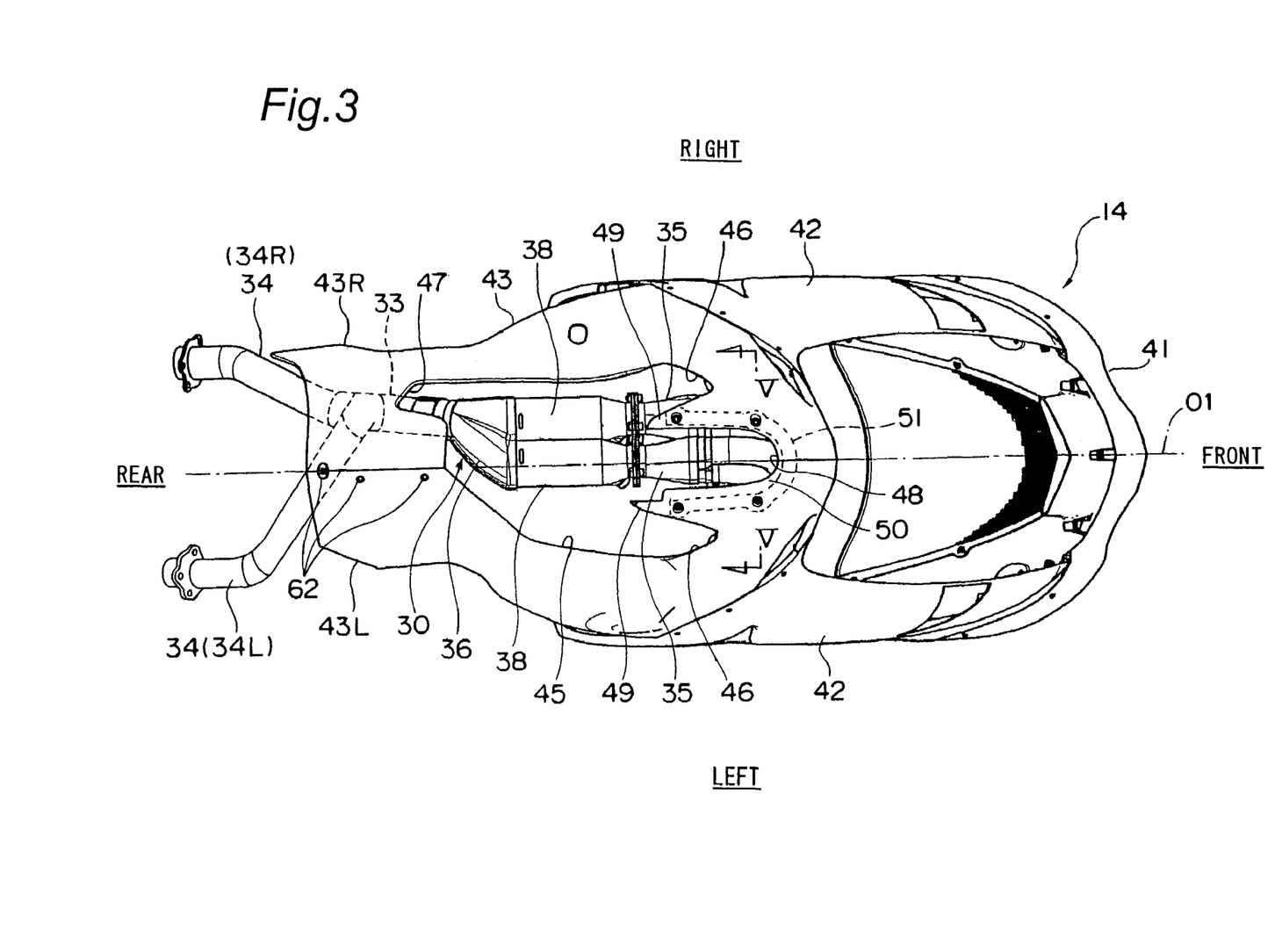
FIG. 3 is a bottom view showing the exhaust pipe and the cowling.
Figure 4:
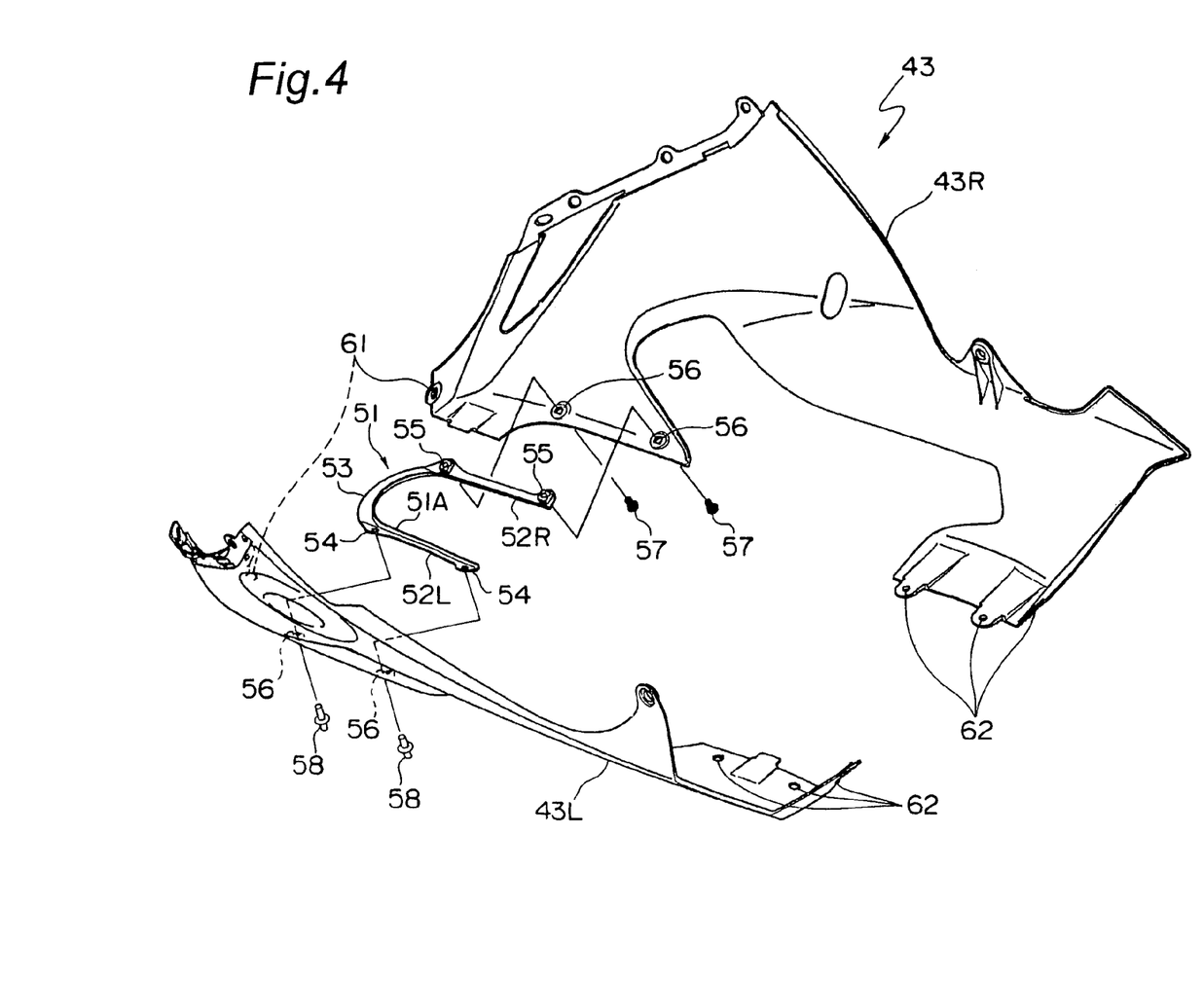
FIG. 4 is an exploded perspective view of a lower cowling of the motorcycle in FIG. 1.

FIG. 3 is a bottom view showing the exhaust pipe 30 and the cowling 14, and FIG. 4 is an exploded perspective view of the lower cowling 43. The lower cowling 43 is structured by right and left divided bodies 43R and 43L coupled to each other at the vehicle width center O1.

An opening 45 is formed at a position corresponding to the catalyst pipe 38 (the catalyst apparatus) at a lower surface of the lower cowling 43. The opening 45 is formed in a hole shape, that is, a shape in which an entire peripheral edge portion of the opening 45 is closed, and is formed in a range surrounding an entirety of the catalyst pipe 38 as seen from the lower side.

As shown in FIG. 1, a lower half of the catalyst pipe 38 is exposed to the outside of the lower cowling 43 through the opening 45 as seen from the side. Accordingly, a height of a lower surface of the catalyst pipe 38 from the ground defines a minimum road clearance of the vehicle body. Further, the opening 45 is provided with a pair of right and left notches 46 greatly cut into a front side in such a manner that the side portion of the first collecting pipe 35 is also exposed thereto. Further, as shown in FIG. 3, in correspondence to the second collecting pipe 36 and the second exhaust pipe 33 being displaced slightly to the right side in the vehicle width direction, a notch 47 greatly cut into a rear side is formed in a rear right side of the opening 45. Further, a notch 48 greatly cut into the front side is formed in a front center portion of the opening 45 in such a manner as to expose the lower side of one of the first collecting pipe 35. Accordingly, the notches 46 in both sides in the lateral direction and the notch 48 in the center in the lateral direction are formed in the front portion of the opening 45, and projections 49 protruding to the rear side are formed between the respective notches 46 and 48.

Figure 5:
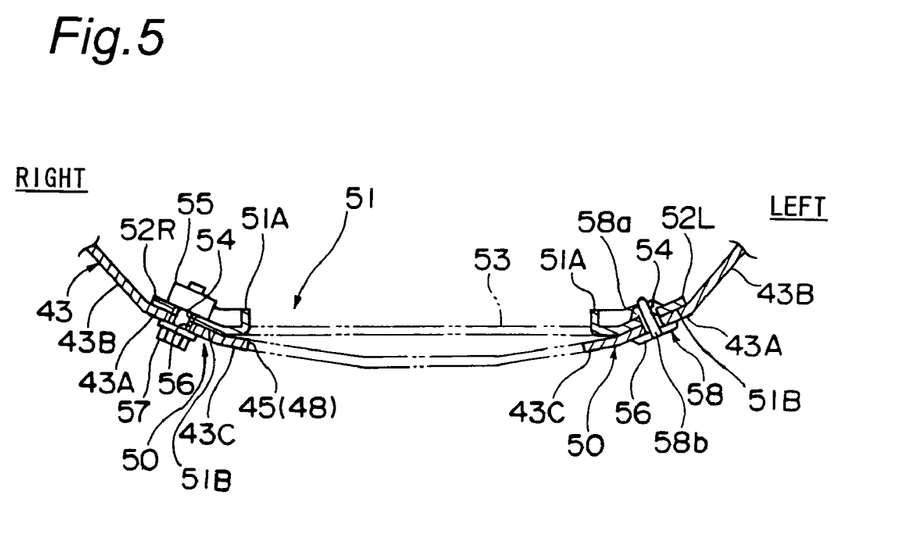
FIG. 5 is a cross sectional view as seen from an arrow V-V in FIG. 3.
Figure 6:
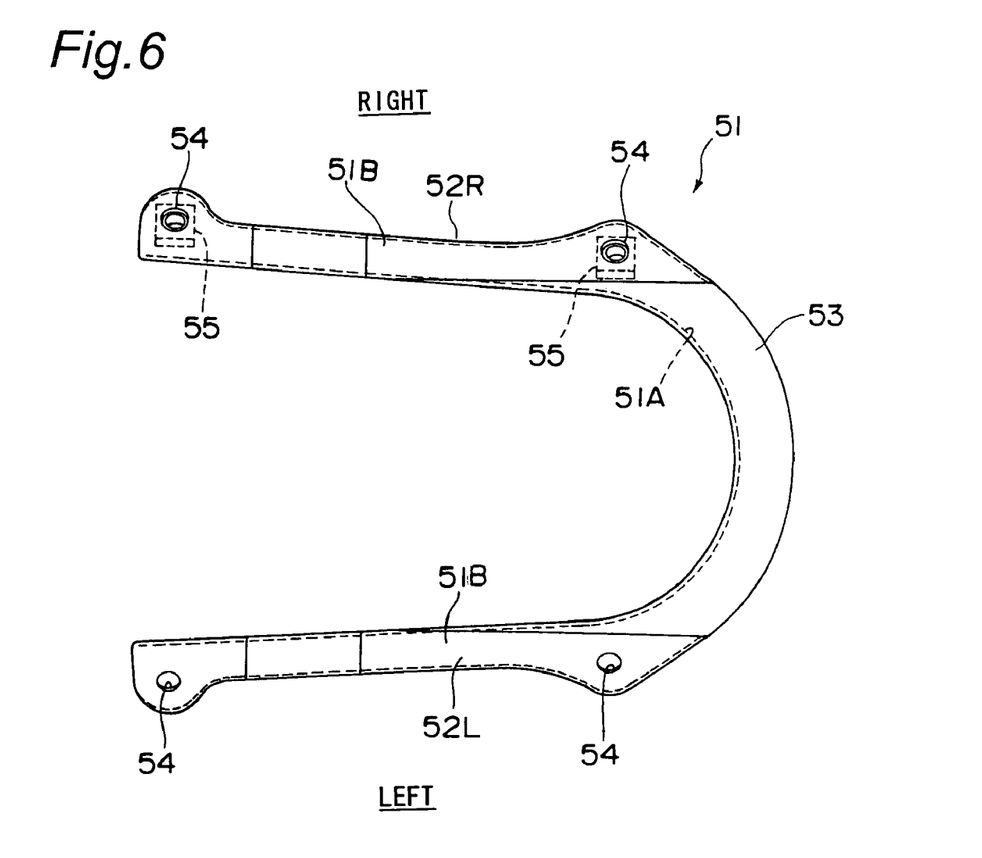
FIG. 6 is a bottom view of a reinforcing member for the lower cowling in FIG. 4.

A peripheral edge portion 50 of the notch 48 in the opening 45 is provided with a reinforcing member 51 having a shape along the peripheral edge portion 50 (including a shape approximately along the peripheral edge portion 50 in addition to the shape strictly along the peripheral edge portion 50). FIG. 5 is a cross sectional view as seen from an arrow V-V in FIG. 3, and FIG. 6 is a bottom view of the reinforcing member 51. The reinforcing member 51 is made of a metal such as iron, stainless steel or the like, and is formed in a U shape in plan view by left and right side pieces 52L and 52R extending in the longitudinal direction, and a semicircular arc shaped junction piece 53 joining front end portions of the left and right side pieces 52L and 52R. A bent piece 51A bent upward is formed at an inner edge portion of the reinforcing member 51.

The left and right side pieces 52L and 52R of the reinforcing member 51 constitute a mounting portion having a mounting surface 51B for mounting to the lower cowling 43. In other words, each of the left and right side pieces 52L and 52R is provided with two holes 54 penetrating in a vertical direction in front and rear sides, and nut members 55 having female threads communicating with the holes 54 are firmly attached to an upper surface of the right side piece 52L. The left and right side pieces 52L and 52R are sloped upwardly in such a manner that the mounting surfaces 51B are directed to an obliquely outer lower side in the lateral direction.

On the other hand, holes 56 corresponding to the holes 54 of the reinforcing member 51 are formed in the peripheral edge portion 50 of the notch 48 of the lower cowling 43, as shown in FIG. 5. Boundary portions between side surfaces 43B and a lower surface 43C of the lower cowling 43 form slope surfaces 43A directed to an obliquely outer lower side in the lateral direction, and the holes 56 are formed in the slope surfaces 43A. Slopes of the mounting surfaces 51B of the left and right side pieces 52L and 52R are approximately identical with slopes of the slope surfaces 43A of the lower cowling 43. Accordingly, the holes 54 and 56 are formed in the left and right side pieces 52L and 52R and the lower cowling 43 in a state of being overlapped with each other.

A screw 57 serving as a fixing device is inserted into each of the holes 54 and 56 in the right side, and the screw 57 is engaged with the nut member 55. A push rivet (a plug-in type fixing device) 58 serving as the fixing device is inserted into each of the holes 54 and 56 at the left side, and the lower cowling 43 and the reinforcing member 51 are fixed at the left side only by inserting the push rivet 58 into each of the holes 54 and 56 in one direction. The push rivet 58 is provided, for example, with a tubular pin main body 58a formed as a split pin shape by a plurality of vertical grooves, and a shaft rod 58b inserted into a tube of the pin main body 58a. The push rivet 58 is structured such that a leading end of the pin main body 58a is expanded to an outer side in a diametrical direction by inserting the pin main body 58a into the holes 54 and 56 and pressing the shaft rod 58b to the leading end side, thereby being prevented from coming off.

The left and right divided bodies 43L and 43R constituting the lower cowling 43 are coupled in one coupling portion 61 in a front side of the opening 45, and three coupling portions 62 in a rear side of the opening 45 by screws, rivets or the like, as shown in FIGS. 3 and 4. The front side coupling portion 61 is provided at a front surface of the lower cowling 43, and the rear side coupling portions 62 are provided at a lower surface at two positions and at a rear surface at one position. Further, the left and right divided bodies 43L and 43R are coupled to each other by the reinforcing member 51 in the front portion side of the opening 45. Meanwhile the reinforcing member 51 may be provided in the rear portion side or over an entire periphery of the opening 45, without being limited to the front portion side of the opening 45.

In accordance with the structure mentioned above, the following operations and effects can be achieved.

(1) As shown in FIG. 3, since the opening 45 in the lower surface of the lower cowling 43 is formed as the hole shape in which the entire peripheral edge portion is closed, a decrease in strength of the lower cowling 43 is reduced in accordance with the formation of the opening 45, and it is possible to prevent flip-flop and vibration from being generated during movement of the motorcycle. Further, since the decrease of the strength is small, it is possible to form the opening 45 as large as possible, and it is possible to reduce a thermal effect by keeping the peripheral edge portion 50 of the opening 45 away from the exhaust pipe 30 (or the catalyst pipe 38).

(2) As shown in FIG. 1, since the notch 46 largely cut into the front side is formed at both the right and left sides of the opening 45, it is possible to increase a heat dissipation performance of the exhaust pipe 30, and it is possible to use the opening 45 as an ornamental element, whereby it is possible to improve an outer appearance of the motorcycle.

(3) Since the opening 45 of the lower cowling 43 is formed so as to stride over the left and right divided bodies 43L and 43R, and the entire peripheral edge of the opening 45 is closed in a state of coupling the left and right divided bodies 43L and 43R, the opening 45 becomes notches in which one side of each of them is open in a state of separating the left and right divided bodies 43L and 43R. Accordingly, it is possible to easily form each of the divided bodies 43L and 43R.

(4) Since the reinforcing member 51 is provided in the peripheral edge portion 50 at the front portion of the lower cowling 43 in such a manner as to stride over the left and right divided bodies 43L and 43R, it is possible to suitably reinforce the lower cowling 43. Further, since the reinforcing member 51 is provided at the inner surface of the lower cowling 43, the minimum road clearance is not reduced and the bank angle does not become smaller, by the existence of reinforcing member 51.

(5) Since the reinforcing member 51 is attached to the slope surface 43A of the lower cowling 43 by the screw 57 and the push rivet 58 inserted from the obliquely lower side, it is possible to easily execute the attaching procedure in comparison with the case in which the screw 57 or the like is inserted from just below, and since a head portion of the screw 57 or the like does not protrude just below, it is possible to secure the minimum road clearance. Further, since the screw 57 or the like is inconspicuous as seen from the side.

(6) Since the reinforcing member 51 serves to reinforce the lower cowling 43, and serves as the coupling member coupling the left and right divided bodies 43L and 43R to each other, it is possible to intend to reduce the number of parts and simplify the structure on the basis of the combined use of the parts.

(7) Since the right side piece 57R of the reinforcing member 51 is fixed to the right divided body 43R by the screw 57, and the left side piece 52L is fixed to the left divided body 43L by the plug-in type push rivet 58, the right side of the reinforcing member 51 can be easily and firmly fixed by the screw 57 in a state of separating the left and right divided bodies 43L and 43R, and the left side of the reinforcing member 51 can be easily fixed only by inserting the push rivet 58, even in a state in which the left and right divided bodies 43L and 43R are coupled.

OTHER EMBODIMENTS

The present invention can be changed as follows.

(1) The opening 45 of the lower cowling 43 may be formed in a partly open shape (a notch shape), and the reinforcing member 51 may be provided in the peripheral edge portion 50 of the opening 45.

(2) The reinforcing member 51 may not be provided in the peripheral edge portion 50 of the opening 45 in accordance with the shape of the lower cowling 43.

(3) The layout of the engine 13 and the number of the cylinders may be appropriately changed, and the layout of the exhaust pipe 30 may be changed in accordance therewith. Further, the muffler 31 may be arranged in the right and left sides of the rear wheel.

(4) The structure and the layout of the opening 45 of the lower cowling 43 and the exhaust pipe 30 may be reversed with reference to the vehicle width center O1.

(5) As the plug-in type fixing device 58, various fixing devices may be applied as far as the installation is finished only by inserting into the holes 54 and 56, without being limited to the push rivet.

(6) The lower cowling 43 may be constituted by three or more divided bodies.

(7) The reinforcing member 51 may be formed by other materials such as synthetic resin or the like without being limited to metal.

(8) The catalyst pipe 38 is not necessarily arranged just under the engine 13, but a part of the catalyst pipe 38 may project from an area under the engine 13 in the lateral direction or the back and forth direction.

(9) The opening 45 of the embodiment mentioned above is formed in the region surrounding the entirety of the catalyst pipe 38 as seen from the lower side, and the lower half of the catalyst pipe 38 is exposed to the outside of the lower cowling 43 as seen from the side. However, the opening is not limited to this embodiment, and may be provided in a portion corresponding to the exhaust pipe 30 or the catalyst pipe 38 in such a manner as to prevent the substantial thermal effect from being applied to the lower cowling 43. In other words, a part of the lower cowling 43 may overlap with the exhaust pipe 30 or the catalyst pipe 38, for example, so long as the substantial thermal effect is not applied to the lower cowling 43.

Although the invention has been described in its preferred embodiments with a certain degree of particularity, obviously many changes and variations are possible therein. It is therefore to be understood that the present invention may be practical otherwise than as specifically described herein without departing from the scope and spirit thereof.

What is claimed is:

1. A motorcycle comprising:
   a vehicle body provided with an engine;
   an exhaust pipe connected to the engine;
   a catalyst apparatus provided in the exhaust pipe and arranged below the engine; and
   a cowling covering at least an under portion of the vehicle body;
   wherein an opening is formed at a position of the cowling corresponding to the catalyst apparatus, and an entire peripheral edge portion of the opening is formed in a closed hole shape; and
   wherein the peripheral edge portion of the opening is provided with a reinforcing member having a shape along the peripheral edge portion.

2. The motorcycle as claimed in claim 1, wherein the cowling is structured by a plurality of divided bodies coupled to each other, and the reinforcing member is provided over the plurality of the divided bodies.

3. The motorcycle as claimed in claim 2, wherein the reinforcing member is provided with a mounting portion attached to the cowling via a fixing device, the mounting portion has a mounting surface directed to a diagonally lower side, and the fixing device is attached in a direction approximately orthogonal to the mounting surface.

4. The motorcycle as claimed in claim 2, wherein the reinforcing member is fixed to one of the divided bodies by a screw, and is fixed to the other of the divided bodies by a plug-in type fixing device.

5. The motorcycle as claimed in claim 1,
   wherein one of front and rear end portions of the opening is provided with a center notch, right and left notches and projections between the center notch and each of the right and left notches,
   wherein the center notch unshrouds a lower side of an exhaust pipe member connected with the catalyst apparatus, the right and left notches unshroud right and left sides of the exhaust pipe member, an right and left projections extend from the one end portion of the opening toward the other end portion of the opening,
   wherein the reinforcing member is formed in a U-shape corresponding to a shape of a peripheral edge portion of the center notch, and extends along the projections.

6. The motorcycle as claimed in claim 1,
   wherein the cowling comprises right and left divided bodies coupled to each other, and the reinforcing member is provided over the right and left divided bodies,
   wherein the catalyst apparatus comprises two catalyst pipes, one of the two catalyst pipes is positioned on a vehicle width center, and the other of the two catalyst pipes is positioned so as to be displaced to a right or left side from the vehicle width center,
   wherein a lower end surface of the catalyst pipe on the vehicle width center defines a minimum ground clearance of the vehicle.

* * * * *